Sept. 30, 1930.  J. M. CROM  1,776,941
DITCH TRIMMER
Filed Jan. 26, 1928
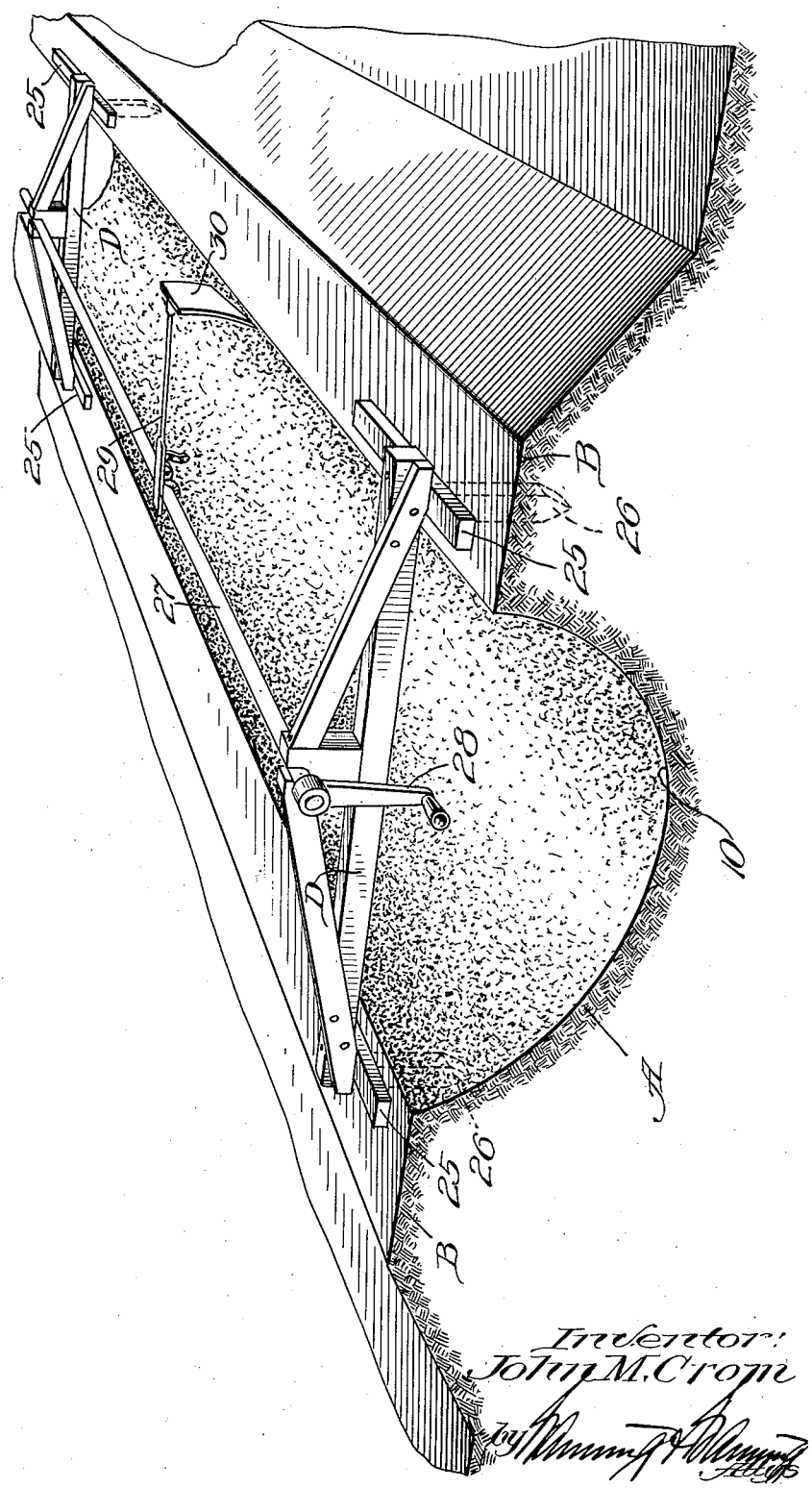
Inventor:
John M. Crom Patented Sept. 30, 1930

1,776,941

UNITED STATES PATENT OFFICE

JOHN M. CROM, OF WILMETTE, ILLINOIS

DITCH TRIMMER

Application filed January 26, 1928. Serial No. 249,518.

This invention relates to a ditch trimmer, which is particularly intended for use in the preparation of ditches of segmental or semi-circular cross section for the reception of a cementitious lining.

The invention will readily be understood from the following description taken in conjunction with the accompanying drawing, which shows a preferred embodiment thereof mounted in place over a ditch for smoothing down the walls thereof.

Referring to the drawing, the ditch comprises a segmental cut A, which is made in the ground, the excavated material being arranged upon opposite sides in the form of embankments B. In its cross section the cut 10 may follow a circular curvature through somewhat less than 180° so as to provide a true segment, or it may be 180° or even somewhat greater.

The trimmer is employed to finish off the surface of the cut to prepare it for the reception of a monolithic cementitious lining, or any other desired lining. The trimmer may comprise a pair of trusses D extending transversely across the ditch, with the truss ends resting upon rails 25 which are aligned with each other upon ground stakes 26. Each truss provides in its center an elevated mounting for a shaft in the form of a pipe 27 which may be rotatable by any desired mechanical appliance, either power or hand-operated. As suggestive of the latter, a crank 28 is shown as applied to the pipe for purposes of rotating the same. Extending radially from the pipe is an arm 29 upon the end of which is a hoe or cutter 30. The opposite end of the arm 29 has a gripping connection with the pipe. This connection may take the form of a toothed link or chain such as is commonly used with wrenches which operate upon the pipe. Upon rotating the crank 28, the pipe and arm will be moved through a circular arc to carry the hoe 30 around the ditch so as to trim off the face thereof. The arm may be adjusted lengthwise of the pipe as the trimming operation proceeds so as to prepare the entire face of the ditch for the application thereto of the monolithic lining hereinbefore referred to. This form of trimmer is advantageous in that it is exceedingly simple, consisting of only such parts as are easily procured and assembled. As an alternative construction the trimmer may be revolved around the pipe as an axis, thus producing exactly the same effect.

Although the invention has been disclosed in connection with the details of a specific embodiment thereof, it should be understood that such details are not intended to be limitative of the invention except in so far as set forth in the accompanying claims.

I claim:

1. A device for trimming ditches comprising, spaced trusses adapted to be disposed transversely of a ditch, a shaft rotatably mounted in said trusses, an arm mounted to rotate with said shaft and adjustable longitudinally thereof, a cutter mounted at the end of said arm, and means for rotating said shaft to cause the cutter to move in a circular arc about the shaft as an axis.

2. A device of the class described comprising, spaced trusses adapted to be disposed transversely of a ditch, aligned rails supporting said trusses, an elevated shaft mounting on each truss, a shaft supported in said shaft mountings, an arm mounted radially on said shaft and adjustable longitudinally thereof, a cutter carried on said arm and having a cutting edge disposed substantially parallel with said shaft, and means for rotating said shaft whereby the cutter will be caused to swing in a circle about said shaft.

3. A device for trimming ditches, comprising spaced trusses adapted to be disposed transversely of a ditch, a shaft mounted on said trusses, an arm mounted upon said shaft and adjustable longitudinally thereof, and a cutter mounted at the end of said arm, said arm being adapted to be rotated to cause the cutter to move in a circular arc about the shaft as an axis.

4. A ditch trimming mechanism in which is comprised supporting means extended across a preformed ditch, a shaft supported by said means, the shaft being aligned centrally with the ditch, and a depending arm carrying a cutter at one end having a mounting upon the shaft adapted to swing about the axis thereof to cause the cutter to trim the ditch.

JOHN M. CROM.